Figure 1:
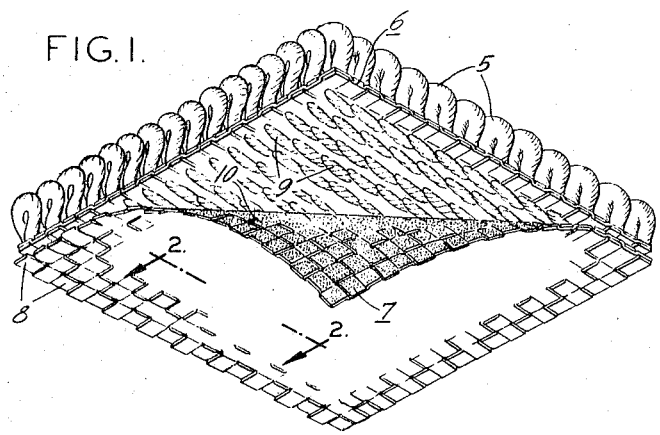

INVENTOR:
ROBERT G. LEVITCH
BY *Hyde W. Ballard*
ATTY.

United States Patent Office 3,336,178
Patented Aug. 15, 1967

3,336,178
DOUBLE BACKED PILE CARPET
Robert G. Levitch, Lexington, Va., assignor to Burlington Industries, Inc., Greensboro, N.C., a corporation of Delaware
Filed Mar. 20, 1964, Ser. No. 353,549
3 Claims. (Cl. 161—66)

This invention relates to an improved pile fabric and more particularly to a pile fabric of the type used as a soft floor covering.

This is a continuation-in-part of my co-pending application Ser. No. 144,629, filed Oct. 12, 1961, now abandoned.

The problem of manufacturing a commercially satisfactory shrinkproof and/or rotproof carpet has been very vexatious. One important application for such a carpet is exemplified in the case of aircraft. For this purpose the carpeting in an airplane is subject to rotting conditions and excessive spillage of liquids which are occasioned due to the normal movement of the aircraft as well as the movement of the aircraft in abnormal weather conditions. Such carpeting cannot be readily serviced and cleaned in the aircraft so that it must be frequently removed and reinstalled. Therefore, any shrinking that does occur renders it impossible to properly replace the carpet in the plane. In other situations carpeting may be subject to rotting conditions since it may not always be possible or practical to remove, clean, and dry the carpet at sufficiently frequent intervals to prevent rotting from occurring. This condition may be present in aircraft as well as in any other more or less stationary installation. However, in the case of aircraft, it has been found that unless the carpet is frequently cleaned and dried, not only is the fabric itself subject to rotting, but a corrosive action takes place between the carpet and the aluminum deck of the aircraft. Carpets having natural fibers such as cotton or jute in the backing are subject to excessive shrinkage when liquids are spilled thereon. Furthermore, a condition of rot occurs around the galley when liquids are accidentally spilled on the carpet, and in the case of aircraft, a certain amount of such spillage cannot be avoided due to the necessity for serving meals on the plane in rough weather. What may be even more critical, however, is the fact that the carpets heretofore used in airplanes are not completely moistureproof and therefore the corrosive action noted above occurs between the carpet and the aluminum deck.

Over and above the advantages of a floor covering meeting the above requirements I provide a synthetic woven backing which has additional advantages from the standpoint of providing dimensional stability, breathing, flexibility, and freedom from deterioration and static.

A primary object of the invention, therefore, is to provide a pile fabric having a synthetic woven backing of generally uniform cross-section.

A further object of the invention is to provide a pile fabric having either a primary or a secondary backing comprising a woven sheet of synthetic material.

Further objects will be apparent from the specification and drawings in which

Figure 2:
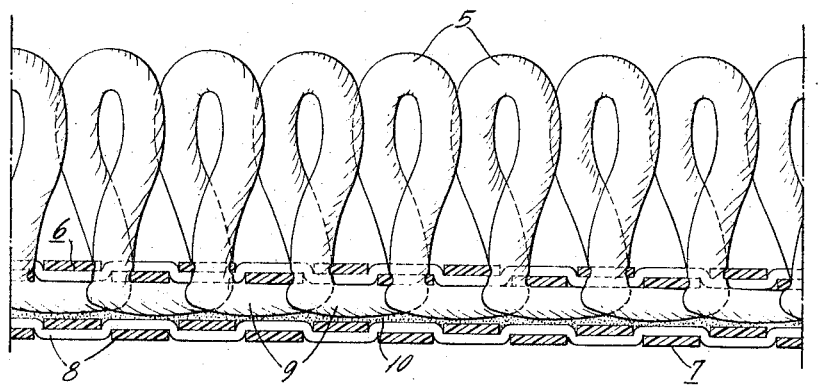
Figure 3:
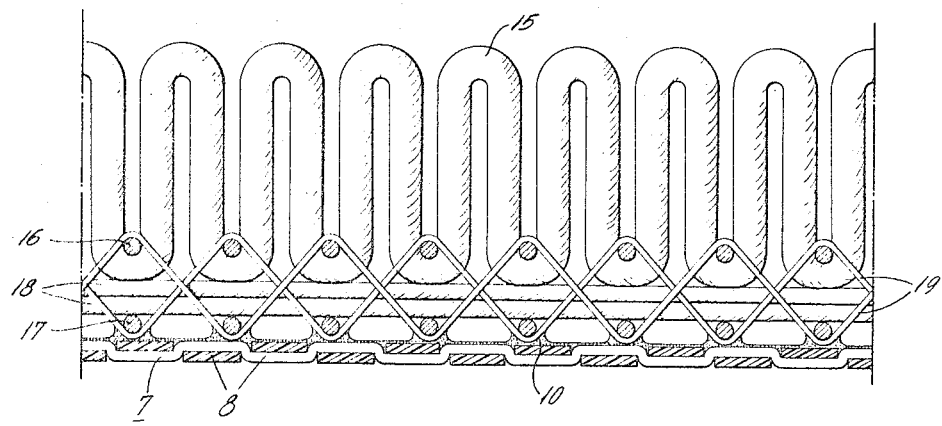

FIGURE 1 is a perspective showing a piece of tufted pile fabric produced in accordance with the present invention having a primary and secondary backing of a woven synthetic plastic material, FIGURE 2 is an enlarged sectional detail as seen at 2—2 of FIGURE 1, and FIGURE 3 is a view similar to FIGURE 2 but showing the secondary backing applied to a woven rather than a tufted fabric.

A pile fabric suitable for a floor covering comprises a plurality of pile projections 5 which may be either cut or uncut. In the present illustration, the pile projections are shown as looped rather than cut. FIGURES 1 and 2 show a tufted fabric in which the pile projections are inserted through a primary backing 6 by means of a series of needles oscillating to carry the pile yarns from the back of the fabric to the face. The provision of a secondary backing for a tufted fabric is and has been common for some time to prevent undesired pulling out of the pile projections and also to provide a firmer base for the fabric. Various materials such as jute, sponge and foam rubber, open mesh scrim, etc. have been tried with varying degrees of success. Also, many types of backsizing materials such as latices have been used. These frequently deteriorate and exude unpleasant odors. Others adhere to the floor surface so that the rug or carpet cannot be removed without serious injury. Still others fail to provide the desired high friction and dimensional stability that are so important in a floor covering. The high friction feature is especially important in the case of area rugs. The dimensional stability is of particular importance in a wall to wall installation where changes in atmospheric conditions such as humidity cause wrinkles when the carpet relaxes if it is not installed with sufficient tension and, conversely, cause rupture if the initial tension or conditions under which the carpet is installed are conductive thereto.

A woven backing material 7 formed of flat ribbon-like strands or yarns 8, 8 has been found to give the most satisfactory results for eliminating or reducing the disadvantages of heretofore used backing. The material may be of any synthetic plastic which is not substantially subject to shrinkage or rotting. Examples of suitable synthetic materials are nylon, acrylic, modacrylic, polyethylene, polyester, polyurethane, vinyl, vinyl chloride, vinylidine chloride, acetate, triacetate, olefin, and rayon. A very satisfactory backing is made from polypropylene yarns employed for both the warp and filling of the backing fabric. Other yarns or combinations thereof may be employed with similarly satisfactory results depending on the cost and ability to produce the material. The most satisfactory backing material either for primary or secondary use has been found to be an imperforate or nonforaminous sheet of relatively uniform thickness. This construction permits breathing and has adequate dimensional stability as well as other desirable features of an extruded non-woven sheet.

FIGURE 2 shows the secondary backing 7 applied to the back of the primary backing 6 and the stitches 9 by means of an adhesive 10. Comparable improved results can be achieved by applying the same type of backing 7 to a woven pile fabric as shown in FIGURE 3. In this case the pile projections 15 are tied in under top shots 16, 16 which are separated from the bottom shots 17, 17 by means of stuffer warps 18, 18. The fabric is bound by means of chain warps 19, 19 all shown in a conventional velvet weave for a two shot fabric. The wefts or shots 16, 17 and the warps 18, 19 all together comprise the primary backing of a typical woven fabric which may be a Wilton or Axminster as well as a velvet. The secondary backing 7 may also be used advantageously with a one shot woven fabric in which the buried stuffer warps are omitted.

It will thus be understood that I have provided an improved pile fabric having a synthetic woven backing material that overcomes the disadvantages heretofore present in other fabrics. The entire fabric may be formed of non-rotting synthetic materials or partially so depending upon the type of installation intended.

Having thus described my invention I claim:

1. A pile fabric having a primary backing, a series of pile projections secured to said primary backing and extending outwardly from one face thereof, and a secondary, synthetic plastic backing secured to the other face of said primary backing, said secondary backing being a non-foraminous woven sheet of substantially uniform thickness and woven of uniform flat strands of synthetic plastic material.

2. A pile fabric in accordance with claim 1 wherein said primary backing is a synthetic plastic backing of uniform thickness and being woven of uniform strands.

3. A tufted pile fabric in accordance with claim 1 wherein said primary backing is made of synthetic plastic material woven of uniform yarns of relatively flat cross-section.

References Cited

UNITED STATES PATENTS

| | | | |
|---|---|---|---|
| 2,675,337 | 3/1954 | Walker et al. | 161—66 X |
| 3,007,836 | 11/1961 | McNamara et al. | 156—72 X |
| 3,110,905 | 11/1963 | Rhodes | 161—65 X |

ALEXANDER WYMAN, *Primary Examiner.*

R. H. CRISS, *Assistant Examiner.*